United States Patent [19]

Swain

[11] Patent Number: 5,273,409

[45] Date of Patent: Dec. 28, 1993

[54] COMPRESSOR ASSEMBLY INCLUDING AN ELECTROMAGNETICALLY TRIGGERED PRESSURE ACTUATED INTERNAL CLUTCH

[75] Inventor: James C. Swain, Columbus, Ohio

[73] Assignee: General Motors Corporation, Detroit, Mich.

[21] Appl. No.: 64,310

[22] Filed: May 20, 1993

[51] Int. Cl.$^5$ .............................................. F01C 21/00
[52] U.S. Cl. ..................................... 418/69; 417/319; 192/83; 192/84 R; 192/84 A; 192/84 B; 192/103 F
[58] Field of Search ............................ 418/69; 417/319; 192/83, 84 R, 84 A, 84 B, 103 F, 53 D, 59

[56] References Cited

U.S. PATENT DOCUMENTS

| | | | |
|---|---|---|---|
| 3,842,378 | 10/1974 | Pierce | 192/84 A |
| 3,910,164 | 10/1975 | Swadner et al. | 92/128 |
| 3,912,060 | 10/1975 | Handke | 192/113 |
| 4,079,820 | 3/1978 | Mattli | 192/3.21 |
| 4,428,718 | 1/1984 | Skinner | 417/223 |
| 4,468,181 | 8/1984 | Sakamoto | 418/55 |
| 4,561,827 | 12/1985 | Beaumont | 417/319 |
| 4,715,800 | 12/1987 | Nishizawa et al. | 418/69 |
| 4,828,463 | 5/1989 | Nishizawa et al. | 417/307 |

Primary Examiner—Richard E. Gluck
Assistant Examiner—Charles G. Freay
Attorney, Agent, or Firm—Patrick M. Griffin

[57] ABSTRACT

A compressor assembly for pumping a recirculating refrigerant including a power input shaft, a power output shaft and a clutch disposed therebetween for translating torque from the power input shaft to the power output shaft. The clutch includes a solenoid for generating an electromagnetic force and an actuator including input friction plates mounted for rotation with the input shaft and output friction plates mounted for rotation with the output shaft. The input and output friction plates are adapted for frictional engagement to translate torque between the input and output shafts. The actuator is responsive to the electromagnetic force to initially move along the axis of the input shaft thereby bringing the input and output friction plates into engagement to translate torque between the input and output shafts to actuate the compressor assembly so as to produce a refrigerant discharge pressure. The actuator is further responsive to the discharge pressure to develop a greater force between the input and output friction plates thereby bringing about full torque translation between the input and output shafts.

4 Claims, 3 Drawing Sheets 5,273,409

COMPRESSOR ASSEMBLY INCLUDING AN ELECTROMAGNETICALLY TRIGGERED PRESSURE ACTUATED INTERNAL CLUTCH

BACKGROUND OF THE INVENTION

Technical Field

The subject invention is directed toward a compressor having a clutch mechanism for translating torque between an input power source and a compressor drive shaft where the clutch is initially electromagnetically actuated to begin torque translation and then responsive to a compressor discharge pressure to bring about full torque translation between the input power source and the compressor drive shaft to actuate the compressor.

Description of the Prior Art

Fluid pumping assemblies such as refrigerant compressors used for compressing a recirculating refrigerant in automotive air conditioning systems generally include some type of clutch mechanism to translate power from a power input source to the drive shaft of the compressor. One standard clutch mechanism commonly in use today includes a continuously driven pulley which is rotatably supported about a tubular extension of a clutch housing via ball bearings. The pulley is driven from the power take off of an automotive engine using a belt in the form of an endless loop as is commonly known in the art. An electromagnetic coil or solenoid generates an electromagnetic force which acts to draw an armature plate across a predetermined gap into frictional engagement with a rotating clutch friction plate. The armature plate is movably mounted to a hub using springs or an elastomeric support member. The hub, in turn, is fastened to a compressor drive shaft. When the coil is energized, the clutch friction plate imparts rotation to the armature plate which, in turn, causes the hub and the compressor drive shaft to rotate thereby driving the compressor.

Examples of electromagnetically actuated clutches employed with refrigerant compressors can be found at U.S. Pat. No. 4,296,851, issued to Pierce on Oct. 27, 1981; U.S. Pat. No. 4,616,742 issued to Matsushita on Oct. 14, 1986 and the clutches disclosed in pending United States patent applications entitled "High Dampening Soft Torque Cushion With Buckling Constraints" and "Clutch Field Operated Oil Injector Valve", both of which are assigned to the assignee of the subject invention.

Unfortunately, the friction load generated between the clutch friction plate and the armature can be very high and often dictate the use of relatively large solenoid coils in order to generate enough electromagnetic force to pull the armature plate across the gap and into frictional engagement with the clutch friction plate. Additionally, and because of the relatively high loads involved, the armature and clutch friction plates are areas of premature wear and failure.

In addition, the externally mounted, dry, electromagnetic clutches are not tolerant of slow engagement which is a desirable characteristic to the consumer. Such clutches wear excessively if engaged slowly. The provision of slow engagement also increases the cost of the electrical control means.

Other clutch mechanisms have been disclosed which employ the compressor discharge pressure to cause frictional engagement between adjacent clutch plates thereby translating torque between an input and output shaft. One such example of this type of clutch mechanism can be found in U.S. Pat. No. 4,715,800 issued to Nishizawa et al on Dec. 29, 1987 and its divisional U.S. Pat. No. 4,828,463 issued on May 9, 1989. The disclosure of both of the Nishizawa patents are identical and therefore will be discussed collectively.

The Nishizawa '800 and '463 patents are directed toward a rotary compressor with a clutch and bypass control actuated by hydraulic and/or compressed fluid. More specifically, these patents disclose a compressor having an electromagnetically actuated valve which controls the flow from a continuously driven small trochoid pump which generates a hydraulic discharge pressure which acts on a pressure responsive clutch plate to cause an initial drive of the compressor. The compressor discharge pressure is then employed to act on the pressure responsive clutch plate to cause full clutch engagement to drive the compressor.

The Nishizawa '800 and '463 compressors do not disclose the use of an electromagnetic force to cause initial clutch actuation. Further, the porting necessary to cause clutch actuation using a hydraulic fluid as well as a refrigerant discharge pressure is rather complex and increases the cost of such compressors.

SUMMARY OF THE INVENTION AND ADVANTAGES

The subject invention overcomes the problems in the prior art in a compressor having a clutch which is initially electromagnetically triggered to cause the compressor to generate a refrigerant discharge pressure and which is then responsive to this discharge pressure to cause full clutch actuation and therefore full torque translation between the input and output shafts of the compressor.

More specifically, the subject invention is directed toward a compressor assembly for pumping a recirculating refrigerant including a power input shaft, a power output shaft and a clutch means disposed therebetween for selectively translating torque from the power input shaft to the power output shaft to drive the compressor assembly. The clutch means includes a stationary solenoid generating an electromagnetic force and an actuator means. The actuator means includes input friction plates mounted for rotation with the input shaft and output friction plates mounted for rotation with the output shaft. The input and output friction plates are adapted for frictional engagement to translate torque between the input and output shafts. The actuator means is responsive to the electromagnetic force generated by the solenoid to initially move along the axis of the input shaft thereby bringing the input and output friction plates into engagement to translate torque between the input and output shafts and thereby actuate the compressor assembly so as to produce a refrigerant discharge pressure. The actuator means is further responsive to the discharge pressure to develop a greater force between the input and output friction plates thereby bringing the input and output friction plates into full engagement to translate torque between the input and output shafts.

In this way, an efficient, cost effective, long life, and slow engaging clutch can be employed using a small inexpensive coil or solenoid and the compressor refrigerant discharge pressure routed through a comparatively simple porting system to bring about torque translation between the compressor input and output shafts.

DETAILED DESCRIPTION OF THE BEST MODE OF CARRYING OUT THE INVENTION

Figure 1:
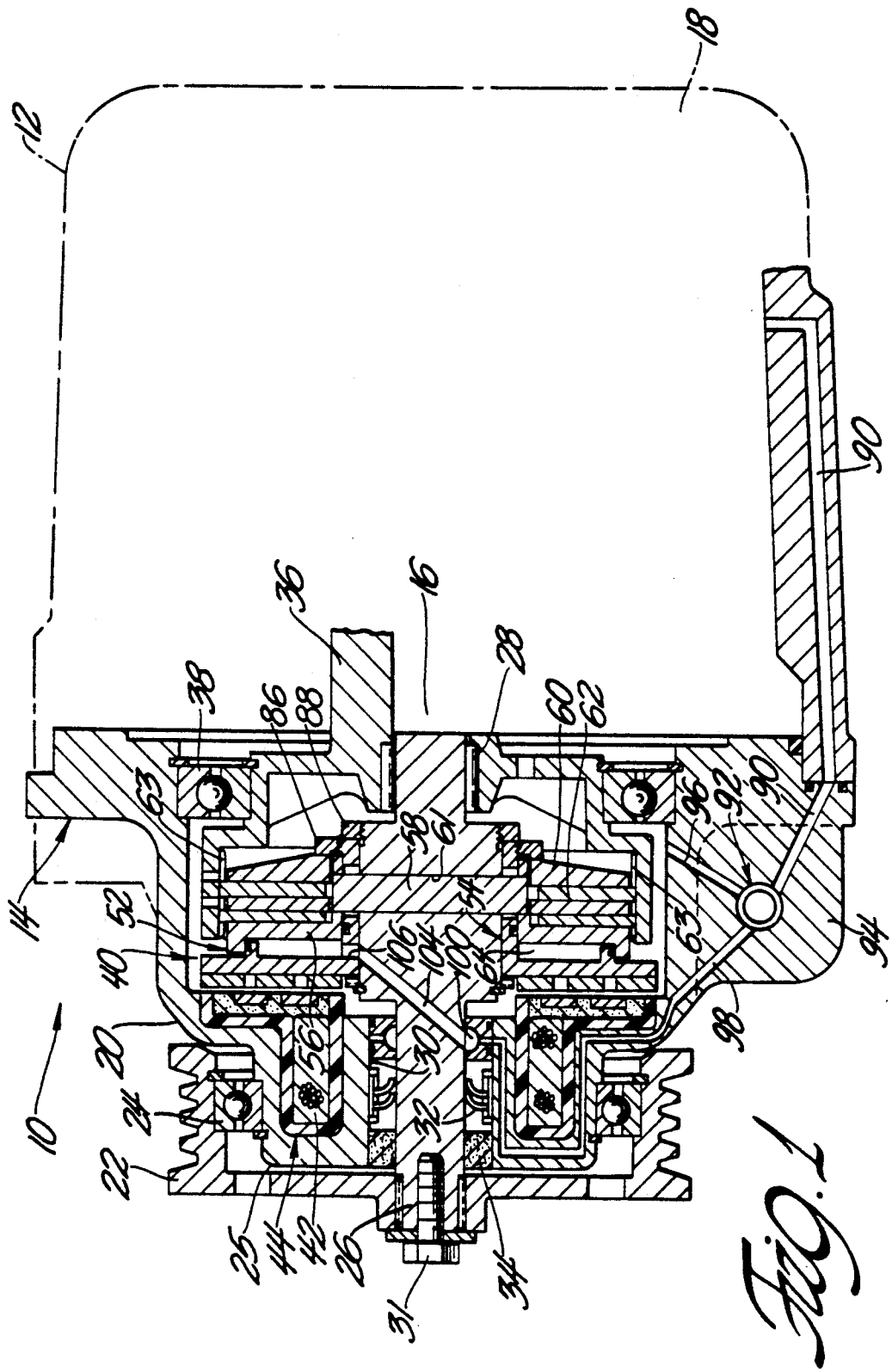
FIG. 1 is a cross-sectional side view of the compressor assembly illustrating the electromagnetically triggered pressure actuated internal clutch of the subject invention.

A compressor assembly having an electromagnetically triggered pressure actuated internal clutch is generally shown at (10) in FIG. 1. The compressor (10) may be of any type commonly employed in automotive air conditioning applications where the compressor is used to pump a recirculating refrigerant through the system which may include a condenser, evaporator etc. as is commonly known in the art. The compressor (10) includes a compressor housing (12), shown in phantom, and a clutch housing, generally indicated at (14) which is mounted to the compressor housing. A compressor mechanism (not shown) is supported within the compressor housing (12) and pumps the refrigerant through the air conditioning system. The compressor mechanism may include a scroll type compressor as shown for example in U.S. Pat. No. 4,468,181 issued to Sakamoto on Aug. 28, 1984; a radial compressor including a plurality of radially disposed pistons reciprocating in cylinders as shown for example in U.S. Pat. No. 3,910,164 issued to Swadner et al on Oct. 7, 1975 and assigned to the assignee of the subject invention; a wobble plate type compressor assembly as shown for example in U.S. Pat. No. 4,428,718 issued to Skinner on Jan. 31, 1984 and assigned to the assignee of the subject invention; a rotary compressor as shown for example in the Nishizawa '800 and '463 patents discussed above or any other compressor assembly employed to pump a recirculating refrigerant as is commonly known in the art. As such, the disclosures of the above-identified prior art patents are incorporated herein by reference.

The compressor housing (12) defines a suction chamber (16) located nearest to the clutch housing (14) and a discharge chamber (18) located at the opposite end of the compressor housing (12). As is commonly known in the art, the suction chamber (16) receives refrigerant at a lower predetermined pressure and then delivers this low pressure refrigerant to the compressor mechanism which compresses the refrigerant and raises its pressure. The discharge chamber (18), on the other hand, is adapted to receive this compressed refrigerant at an elevated discharge pressure and then routes the refrigerant along to the next stage in the air conditioning system.

The clutch housing (14) is a substantially cup-shaped member which defines a stepped tubular extension (20) on its outer diameter. A rotor means in the form of a pulley (22) is rotatably mounted on ball bearings (24) about the end hub (25) of the tubular extension (20). The pulley (22) is typically coupled to the power take off of an automotive engine (not shown) via an endless loop belt (not shown), as is commonly known in the art.

A power input shaft (26) is rotatably supported on needle bearings (28) in the power output shaft (36) and is operatively coupled to the pulley (22) through center post bolt (31) such that the input shaft (26) is continuously driven by the pulley (22). A Teflon sealing member (32) and a felt ring (34) are employed about the input shaft (26) and opposite the needle bearings (28) to seal the inner workings of the compressor assembly (10) from the atmosphere. A power output shaft (36) is similarly rotatably supported by ball bearings (38) within the clutch housing (14) and is adapted to power the compressor mechanism housed within the compressor housing (12). As shown in the figures, the output shaft (36) is of the type which would be employed to drive a scroll type compressor as shown, for example, in the '181 Sakamoto patent, but it is to be understood that the shaft (36) could be configured to drive any other type of compressor.

The compressor assembly (10) further includes a clutch means, generally shown at (40) in FIG. 1, which is disposed between the power input shaft (26) and the power output shaft (36) for selectively translating torque between the input and output shafts (26), (36), respectively. More specifically, and referring now to FIG. 2, the clutch means includes means for generating an electromagnetic force in the form of a radially compact, annular coil or solenoid (42). The solenoid (42) is encased in a magnet frame, generally indicated at (44), which is disposed annularly about the central passage (30) and the input shaft (26) and which is non-rotatably mounted within the inwardly opening U-shaped end hub (25) formed by the stepped tubular extension (20) of the clutch housing (14). The magnet frame (44) itself also includes a U-shaped portion (46) having reduced inner and outer radii which closely conform to the annular solenoid (42) and an annular flared portion (48) disposed at the open end of the magnet frame's U-shaped portion (46). The flared portion (48) has a radius greater than the outer radius of the U-shaped portion (46) such that the U-shaped portion (46) and the flared portion (48) form a cup-shaped pocket at the open end of the magnet frame (44).

The magnet frame (44) further includes two rings (50) mounted in epoxy disposed within the magnet frame's cup-shaped pocket with each of the rings in concentric spaced relation to each other and to the U-shaped portion (46) and the flared portion (48). The rings (50) are of material similar to the magnet frame, non-permanent magnetic material.

The clutch means (40) further includes an actuator means, generally indicated at (52), having a clutch actuating piston member, generally indicated at (54) and a clutch reaction piston member, generally indicated at (56). The clutch actuating piston member (54) is mounted for rotation with the input shaft (26) but is slidable axially along the input shaft (26) for a predetermined distance. The clutch reaction piston member (56) is mounted to the clutch actuating piston member (54) and rotates with the clutch actuating piston member (54) and the input shaft (26). However, the clutch reaction piston member (56) is fixed axially with respect to the input shaft (26) via a steel pin (58) which, in turn, is fixed in an aperture (61) through the input shaft (26) and locks the clutch reaction piston member (56) against axial movement.

The clutch means (40) further includes one or more annular input friction plates (60) which are rotatably mounted at their inner diameter to the clutch reaction piston member (56) and one or more annular output friction plates (62) which are rotatably mounted at their outer diameter to the output shaft (36). More specifically, the clutch means (40) includes two input friction plates (60) each of which are disposed adjacent an output friction plate (62), of which there are also two. The input friction plates (60) are splined or otherwise movably mounted to the clutch reaction piston member (56) so as to be movable along the axis of the input shaft (26) in response to movement of the clutch actuating piston member (54). Similarly, the output friction plates are splined or otherwise movably mounted at their outer diameters to the cup-shaped portion (63) of the output shaft (36) so as to be moveable along the axis of the input shaft (26) in response to movement of the clutch actuating piston member (54). In this way, the input and output friction plates (60), (62) respectively, are adapted to be moved into engagement with each other to translate torque from the input shaft (26) to the output shaft (36).

The clutch actuating piston member (54) and the clutch reaction piston member (56) cooperate to form a pressure chamber (64) for receiving compressed refrigerant at discharge pressure which acts on the clutch actuating piston member (54) to move it axially along the input shaft (26) thereby bringing the friction plates (60), (62) into engagement as will be discussed in greater detail below.

The clutch actuating piston member (54) includes an annular sliding portion (66) which is movably mounted about an oversized portion (68) of the input shaft (26). The oversized portion (68) has an enlarged diameter relative to the remaining portion of the input shaft (26). The sliding portion (66) includes an oversized aperture (70) which accommodates the steel pin (58) and secures the clutch actuating piston member (54) for rotation with the shaft (26) but which allows the clutch actuating piston member (54) to move axially relative to the input shaft (26).

The clutch actuating piston member (54) further includes a transverse portion (72) which moves axially with the sliding portion (66) but which extends perpendicular to the axis of the input shaft (26). An armature plate (74) is mounted to the face of the transverse portion (72) in spaced parallel relationship to the rings (50) across a predetermined gap. As with the rings (50), the preferred embodiment of the armature plate (74) consists of a plurality of concentric rings which are mounted in spaced concentric relation to one another on the transverse portion (72). These rings are of a non-permanent magnetic material similar to the magnet frame. The electromagnetic force generated by the solenoid (42) acts through the magnet frame (44) on the armature plate (74) to cause the armature plate (74) and thus the clutch actuating piston member (54) to move toward the rings (50). The armature plate (74) approaches close enough to the rings (50) that an appreciable axial force is generated but it never touches the end plate. In order that the electromagnetic force act efficiently through the armature plate (74), it is desirable that at least the transverse portion (72) of the clutch actuating piston member (54) be made of a non-magnetic material, such as aluminum. In this way, the electromagnetic force will not "short circuit" through the clutch actuating piston member (54).

Similarly, the clutch reaction piston member (56) includes an axially extending, annular portion (76) which is disposed concentrically about the sliding portion (66) of the clutch actuating piston member (54) and the oversized portion (68) of the input shaft (26). However, unlike the sliding portion (66), the annular portion (76) is fixed axially via the steel pin (58) which extends into two diametrically opposed holes (78) in the annular portion (76).

The clutch reaction piston member (56) further includes an upstanding portion (80) extending perpendicular to the longitudinal axis of the input shaft (26) and disposed in spaced parallel relationship to the transverse portion (72). A bridge (82) extends between the transverse portion (72) and the upstanding portion (80) and, all together, they form the pressure chamber (64). An 0-ring (84) is disposed annularly about the sliding portion (66) of the clutch actuating piston member (54) and between the sliding portions (66) and the annular portion (76) of the clutch reaction piston member (56) to maintain the integrity of the seal between the piston members (54), (56) and within the pressure chamber (64). Similarly, an 0-ring (85) is located between the outer diameter of the transverse portion (72) and the bridge (82).

Figure 2:
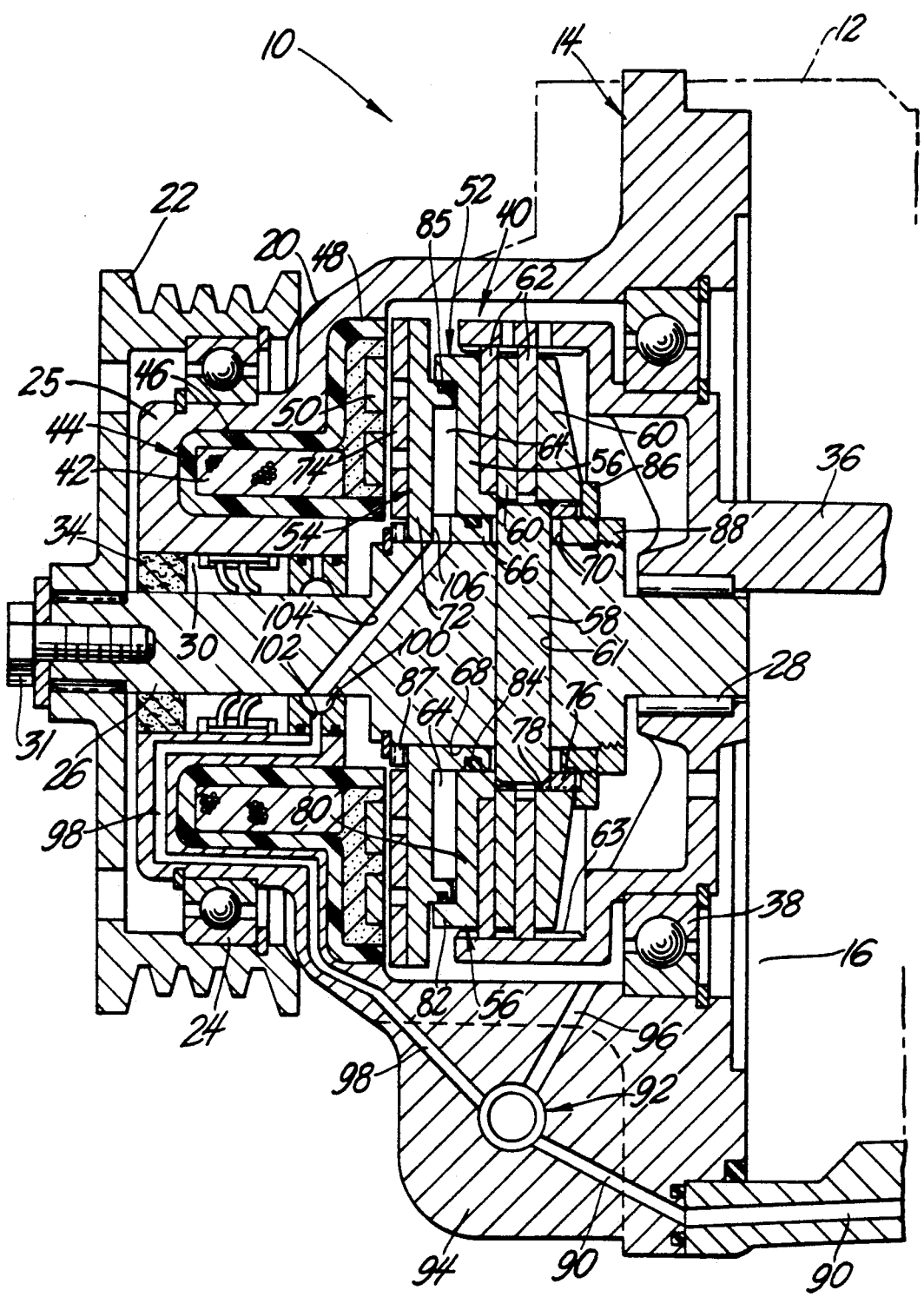
FIG. 2 is an enlarged cross-sectional side view of the electromagnetically triggered pressure actuated internal clutch of the subject invention.

When the clutch actuating piston member moves to the left as viewed in either FIGS. 1 and 2, under the influence of the electromagnetic force or the refrigerant pressure in the pressure chamber (64), a friction plate bearing nut (86) threadably and adjustably disposed on the tail end of the sliding portion (66) acts on the back input friction plate (60) which causes this friction plate to move to the left as viewed in FIGS. 1 and 2 squeezing the adjacent output friction plate (62) which in turn moves axially to the left to come into frictional engagement with the next adjacent input friction plate (60). That friction plate (60) then is squeezed into frictional engagement with the next adjacent output friction plate (62) which is sandwiched between an input friction plate (60) and the backside of the upstanding portion (80) of the clutch reaction piston member (56) which is axially fixed relative to the input shaft (26). In this way, the frictional forces and the torque which are translated between the input and output shafts (26), (36), respectively are spread out over a plurality of friction surfaces thereby reducing the individual loads carried by each friction plate and increasing the longevity of the plates (60), (62). In addition, the torque which can be transmitted for a given axial force is directly proportional to the number of friction interfaces.

When power to the solenoid (42) is cut off and refrigerant is also prevented from entering the pressure chamber (64) by control valve (92), return springs (87) act on the clutch actuating member (54) to move it to the right as viewed in FIGS. 1 and 2 such that the friction plates (60), (62) are moved out of engagement and therefore no torque is translated therebetween. An adjustable stop bearing nut (88) located at the terminal end of the oversized portion (68) of the input shaft (26) limits the movement of the clutch actuating piston member (54) to the right as viewed in FIGS. 1 and 2 and is employed to adjust the de-energized air gap between the coil end rings (50) and the armature plate (74).

Referring now to FIG. 1, a delivery passage (90) is in fluid communication with the discharge chamber (18) of the compressor (10). The compressor assembly (10) further includes a control valve, generally indicated at (92), disposed within a boss (94) in the clutch housing (14). The control valve (92) controls the flow of refrigerant at discharge pressure to either act on the pressure chamber (64) or to prevent refrigerant pressure from acting on the pressure chamber (64). More specifically, the control valve (92) is adapted to direct the flow of discharge refrigerant to the pressure chamber (64) through actuator discharge passage (98) or to block the flow of discharge refrigerant from reaching the pressure chamber (64) and exhaust pressure chamber (64) to suction chamber (16) via passages (98) and (96). The passage (98) extends through the boss (94) in the clutch housing, through the end hub (25) around the magnet frame (44) and is in fluid communication with an annular intermediate chamber (100) disposed about the input shaft (26) via port (102). A shunt passage (104) diagonally disposed through the input shaft (26) provides fluid communication between the annular intermediate chamber (100) and the pressure chamber (64) through an aperture (106) disposed in the annular sliding portion (66) of the clutch actuating piston member (54).

As described above, the control valve (92) is movable to a first position to prevent the refrigerant discharge pressure from acting on the clutch actuating piston member (54) via the pressure chamber (64) by blocking the elevated discharge pressure at passage (90) and exhausting pressure chamber (64) to the suction chamber (16) via passages (98) and (96).

The control valve (92) is also moveable to a second position which routes the elevated discharge pressure from the discharge chamber (18) through passage (98), annular intermediate chamber (100) and shunt passage (104) into the pressure chamber (64) to act on the clutch actuating piston member (54) to move it axially along the input shaft (26) to the left as viewed in FIGS. 1 and 2 so as to cause torque translation through the friction plates (60), (62) and between the input and output shafts (26), (36) respectively.

Figure 3:
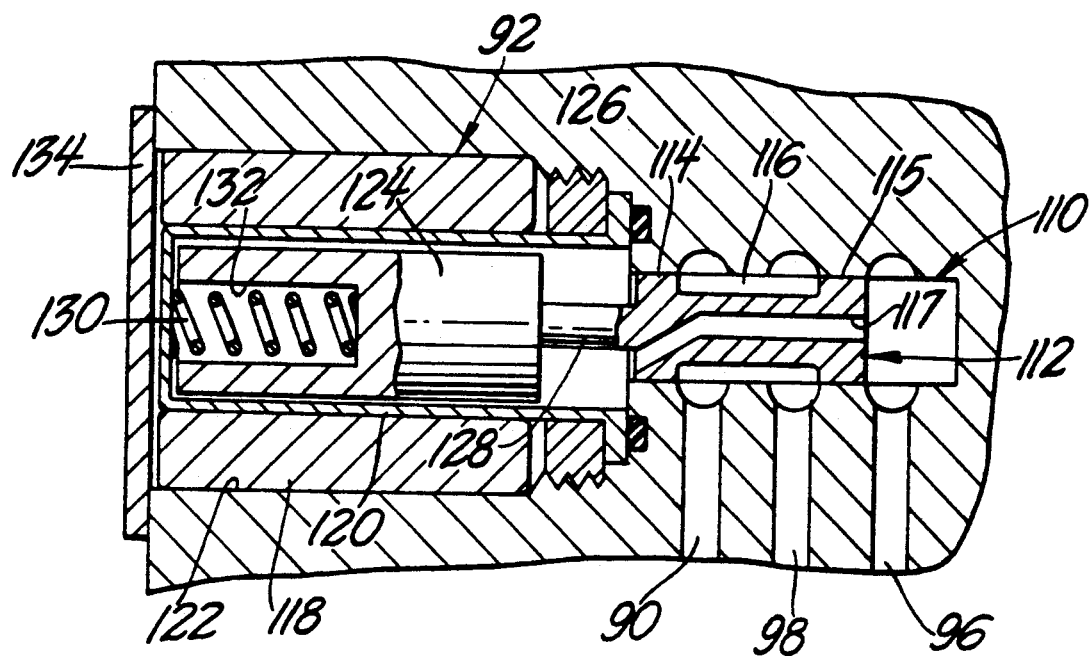
FIG. 3 is a cross-sectional side view of the control valve used to direct the flow of the compressed refrigerant in the compressor assembly of the subject invention.

As can be seen in FIG. 3, the control valve (92) is a solenoid actuated spool valve. The control valve (92) includes a valve body, generally indicated at (110), disposed within the boss (94) and a shuttle valve member, generally indicated at (112), which is moveable between first and second positions within the valve body (110). It is shown in FIG. 3 in the second position. The valve member (112) includes a pair of lands (114), (115) having one diameter and a reduced diameter portion (116) which creates a flow passage through the valve body (110) to direct the flow of compressed refrigerant between the delivery discharge passage (90), and actuator discharge passage (98) and between the actuator discharge passage (98) and the suction relief passage (96) as will be discussed in greater detail below. The valve member (112) further includes a balance passage (117) which extends axially through the valve member (112) to equalize the pressures on either side of the lands (114), (115).

A valve coil (118) is disposed about a hermetic boundary tube (120) both of which are located in a coil chamber (122) of the valve (92). A solenoid armature (124) is disposed within the boundary tube (120) which is secured in place with a hold down nut (126). The hermetic boundary tube (120) and hold-down nut (126) allow the valve coil (118) to be replaced without disturbing the refrigerant charge in the system. A connecting rod (128) extends between the valve member (112) and the solenoid armature (124). A coiled spring (130) is disposed within a recess (132) in the solenoid armature (124) and biases the armature (124) and therefore the valve member (112) to the right as viewed in FIG. 3. The valve (92) is sealed with a cover plate (134).

When the valve coil (118) is not energized, the spring (130) biases the solenoid armature (124) and thus the valve member (112) to the right to its first position so as to cut off fluid communication between passage (90) and passage (98). In this position, the land (114) blocks the passage (90) and passage (98) is in fluid communication with the suction relief passage (96) to the suction chamber (16) via flow passage (116). In this way, the pressures in the pressure chamber (64) and the suction chamber (16) are equalized and the clutch actuating piston member (54) is moved to the right under the influence of return springs (87) as viewed in FIGS. 1 and 2. The friction plates (60), (62) are therefore moved out of engagement. In this way, torque translation between the input and output shaft (26), (36) is terminated.

When the valve coil (118) is energized, it generates an electromagnetic force which acts on the solenoid armature (124) to move it to the left as viewed in FIG. 3 against the biasing force of the spring (130). The valve member (112) is, in turn, moved to the left and thereby provides fluid communication between the actuator discharge passage (98) and the delivery passage (90) via flow passage (116) through which compressed refrigerant flows to act on the clutch actuating piston member (54).

The clutch means (40) of the subject invention operates in the following manner. The clutch actuating piston member (54) is initially responsive to the electromagnetic force generated by the clutch solenoid (42) to move axially along the input shaft (26) to bring the input and output friction plates (60), (62) into initial frictional engagement to begin torque translation from the input shaft (26) to the output shaft (36) to drive the compressor assembly (10) so as to produce a refrigerant discharge pressure. The clutch actuating piston member (54) is further responsive to the refrigerant discharge pressure when the valve member (112) is in its second position to bring the input and output friction plates (60), (62) to engagement at a higher force level resulting in full torque translation from the input to the output shafts 26, 36 to drive the compressor. Once full torque translation between the input and output shafts has been achieved, the solenoid (42) may be de-energized. The load of the clutch actuating piston member (54) is maintained on the friction plates (60), (62) by the influence of the refrigerant discharge pressure. Despite the movement of the clutch actuating piston member (54), however, the coil end rings (50) which are stationary and the armature plate (74) which is rotating never touch and parasitic torque loss is prevented. All torque translation is born by the input and output friction plates (60), (62).

The subject invention therefore overcomes the problems in the prior art through a clutch having a clutch actuating piston member which is responsive to the electromagnetic force generated by a small, radially compact coil to initiate torque translation between the input and output shafts and which is further responsive to a refrigerant discharge pressure to cause full torque translation between the input and output shafts. The invention's reliance upon only refrigerant pressure and not hydraulic/refrigerant pressure as disclosed by the prior art and the plurality of friction plates provides for a cost effective compressor assembly having an efficient clutch mechanism.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A compressor assembly for pumping a recirculating refrigerant, said assembly comprising;

a power input shaft, a power output shaft and a clutch means disposed therebetween for selectively translating torque from said power input shaft to said power output shaft;

said clutch means including a means for generating an electromagnetic force and actuator means including input friction plates mounted for rotation with said input shaft and output friction plates mounted for rotation with said output shaft, said input and output friction plates adapted for frictional engagement to translate torque between said input and output shafts, said actuator means responsive to said electromagnetic force to initially move along the axis of said input shaft thereby bringing said input and output friction plates into engagement to translate torque between said input and output shafts to actuate said compressor assembly so as to produce a refrigerant discharge pressure, said actuator means further responsive to said discharge pressure to apply a higher level of force thereby bringing said input and output friction plates into full engagement to translate torque between said input and output shafts.

2. A compressor assembly for pumping a recirculating refrigerant, said assembly comprising;

a power input shaft, a power output shaft and a clutch means disposed between said power input and output shafts for selectively translating torque from said power input shafts to said power output shaft to drive the compressor assembly;

said clutch means including a solenoid for generating an electromagnetic force, a clutch actuating piston member rotatably mounted with said input shaft and slidable axially along said input shaft for a predetermined distance, a clutch reaction piston member rotatably mounted to said clutch actuating piston member but fixed axially with respect to said input shaft, at least one input friction plate rotatably mounted to said clutch reaction piston member and moveable along the axis of said input shaft in response to movement of said clutch actuating piston member, at least one output friction plate rotatably mounted to said output shaft and moveable along the axis of said input shaft in response to movement of said clutch actuating piston member, said input and output friction plates adapted for engagement to translate torque from said input shaft to said output shaft;

said clutch actuating piston member being initially responsive to said electromagnetic force generated by said solenoid to move axially along said input shaft to bring said input and output friction plates into initial frictional engagement to begin torque translation from said input shaft to said output shaft to drive said compressor so as to produce a refrigerant discharge pressure, said clutch actuating piston member being further responsive to the refrigerant discharge pressure to apply a higher level of force thereby bringing said input and output friction plates into full frictional engagement resulting in full torque translation from said input to said output shaft to drive said compressor.

3. An assembly as set forth in claim 2 further characterized by said clutch actuating piston member and said clutch reacting piston member cooperating to form a pressure chamber for receiving refrigerant at a discharge pressure, said refrigerant acting on said clutch actuating piston member to apply a higher level of force to the input and output friction plates.

4. An assembly as set forth in claim 3 further characterized by said input friction plates being mounted at their inner diameter to said clutch reaction piston member and said output friction plate being mounted to said output shaft at their outer diameter.

* * * * *